Jan. 21, 1941.     M. TELKES     2,229,481
THERMOELECTRIC COUPLE
Filed March 31, 1939     2 Sheets-Sheet 1
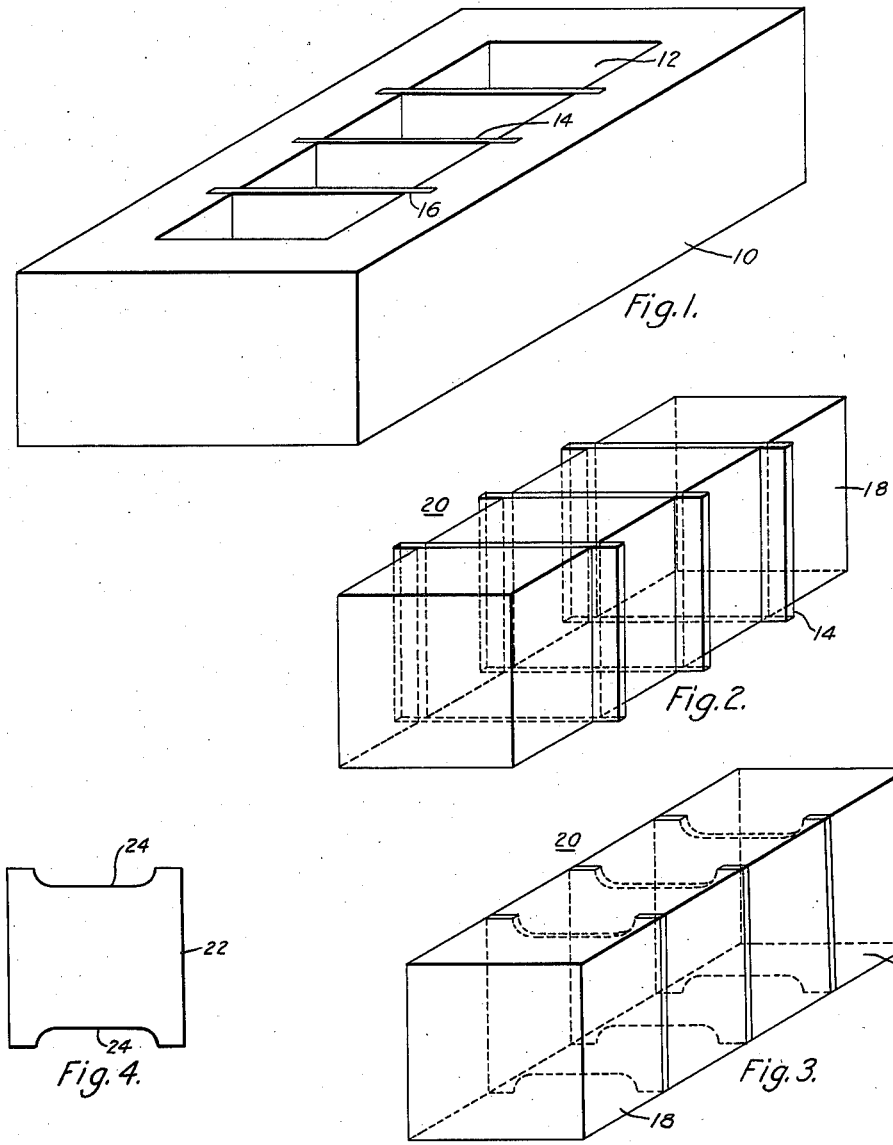

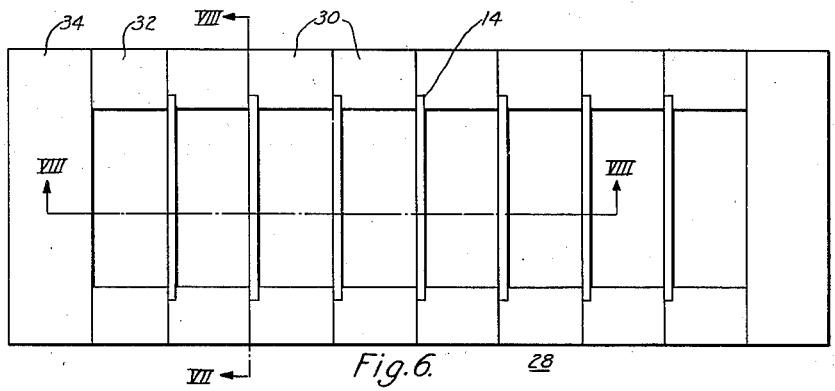
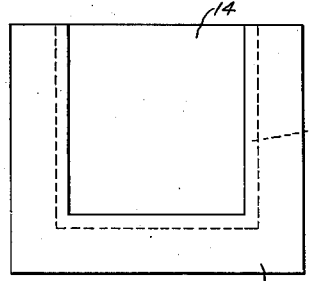
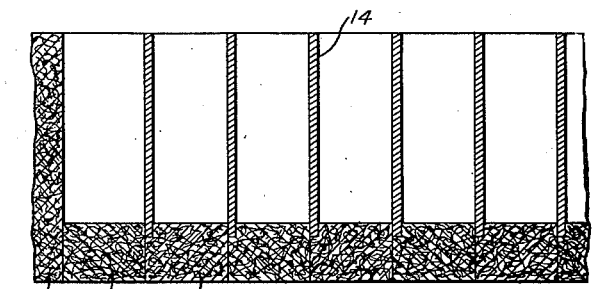
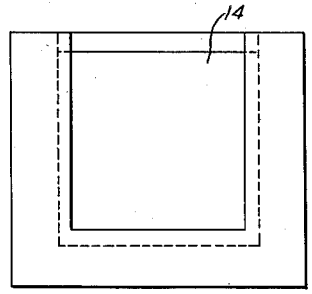
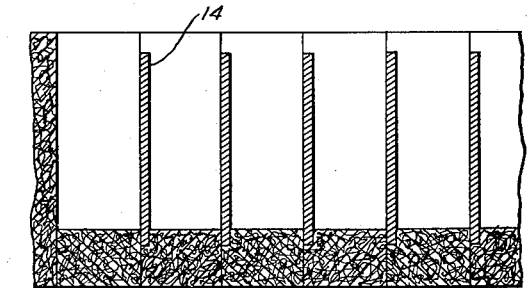

Patented Jan. 21, 1941

2,229,481

UNITED STATES PATENT OFFICE 2,229,481

THERMOELECTRIC COUPLE

Maria Telkes, Edgewood, Pa., assignor to Westinghouse Electric & Manufacturing Company, East Pittsburgh, Pa., a corporation of Pennsylvania Application March 31, 1939, Serial No. 265,200

7 Claims. (Cl. 136—5)

This invention relates generally to apparatus for the conversion of thermal energy to electrical energy, and particularly to an element suitable for use in thermocouples and to thermocouples embodying the invention.

This application is a continuation-in-part of my application Serial No. 102,491, filed September 25, 1936, and which is directed to Thermoelectric couples.

Prior attempts to use thermocouples for the transformation of thermal energy, and particularly solar radiation into electric energy, have been proven to be impractical, principally because of their low efficiency or the lower ratio of electrical energy output obtained to the input of thermal energy when both are experienced in the same physical units.

In my copending application Serial No. 265,199, filed March 31, 1939, and which is directed to Thermoelectric couples, there is disclosed and claimed a thermocouple element comprising from 42% to 45% of zinc and from 58% to 55% of antimony, this particular combination proving to be highly efficient when employed as the positive element of a thermocouple, giving a useful efficiency of from 4% to 6%. As disclosed in application Serial No. 265,199, it is thought that these high efficiencies are obtained by reason of the particular combination of zinc and antimony giving an element which has a very low specific resistance and a Wiedemann-Franz ratio which approaches the normal Wiedemann-Franz ratio of $7.8 \times 10^{-6}$ for most metals at room temperature. In these elements a portion of the zinc thought to be a part of the zinc content in excess of the atomic weight of zinc which alloys with antimony, is present in the form of a substantially uniform dispersion throughout the element.

In employing the zinc-antimony elements described and which are highly efficient, it is found that they are somewhat unstable to the extent that after they have been in use for a period of time as the positive element of a thermocouple, a feathering or the formation of hair-like tendrils is noticed at the end of the positive element at the cold junction of the thermocouple with an accompanying decrease in its efficiency. This feathering is thought to be occasioned by the migration of a portion of the zinc through the positive element to its cold junction as a current flows therethrough. Such feathering or formation of tendrils of zinc is objectionable.

An object of this invention is to provide a thermocouple element of zinc and antimony having strips of a dissimilar metal disposed therein for limiting the migration of zinc and the formation of feathering when a current flows therethrough.

Another object of this invention is to provide a thermocouple element formed from a metallic body containing zinc and antimony in predetermined proportions and having barriers of dissimilar metal disposed in spaced relation therein limiting the migration of zinc in the element without detrimentally effecting the efficiency of the element when employed as a positive element of the thermocouple.

Other objects of this invention will be apparent from the following description when taken in conjunction with the accompanying drawings, in which:

Figure 1 is a view in perspective of a mold employed in producing the element of this invention, Fig. 2 is a view greatly exaggerated in perspective of an element embodying this invention, Fig. 3 is a view in perspective and greatly exaggerated of another embodiment of this invention, Fig. 4 is a view in elevation and greatly exaggerated of a barrier employed in the element of Fig. 3, Fig. 5 is a view in perspective and greatly exaggerated of a thermocouple embodying an element of this invention, Fig. 6 is a plan view of another mold employed in producing the element of this invention, Fig. 7 is a view in elevation taken along the line VII—VII of Fig. 6, Fig. 8 is a view in section taken along the line VIII—VIII of Fig. 6, Fig. 9 is a view similar to Fig. 7 and illustrates an embodiment of this invention, and Fig. 10 is a view similar to Fig. 8 illustrating the positioning of the mold sections and barrier strips as employed in producing the element of this invention.

In forming the thermocouple element of this invention, zinc and antimony in predetermined proportions of from 42% to 45% by weight of zinc and from 58% to 55% by weight of antimony, as disclosed and claimed in application Serial No. 265,199, are utilized in forming the metallic body of the element. The metallic body can be formed in different ways, as by casting molten zinc and antimony or by so fusing granules of the zinc and antimony in predetermined proportions as to secure a solid homogeneous body having a portion of the zinc in dispersion in the resulting body. This particular combination of zinc and antimony gives a metallic body which is highly efficient in the conversion of the thermal energy to electrical energy.

In order to render the zinc-antimony element substantially stable, thereby maintaining its high efficiency of conversion of thermal energy to electrical energy, it has been found to be desirable to insert a plurality of barriers in the element to control or limit the migration of the portion of zinc which is in the form of a dispersion in the element. These barriers are of positive metal as measured against constantan.

Referring to the drawings, this invention is illustrated by reference to a particular method for producing the desired elements. In Fig. 1 there is shown a mold 10 of graphite or other suitable material of low heat conductivity having a cavity 12 therein of the shape and size of the desired element.

In order to so position barriers 14 of metal such as iron selected from the iron group in spaced relation to each other as to divide the resulting element into predetermined sections, grooves 16 are provided in the side walls of the cavity of the mold 10 of a size suitable for receiving the ends of the barriers 14. In practice, the barriers 14 shown greatly exaggerated in the drawings are exceedingly thin strips or ribbons of iron, cobalt or other metal which has a high conductivity and are preferably not over .01 inch thick. In order to efficiently perform as barriers, the iron or other metallic strips 14 are preferably of a rectangular shape and preferably of a size substantially equal to the cross section of the element which it is desired to produce. It has been found that in order not to detrimentally affect the specific resistance of the resulting element described more fully hereinafter, that the barriers employed should be so limited as to constitute not more than 5% of the resulting element. These barriers are so disposed in the cavity of the mold that they extend across the finished element transverse to the flow of current in the element when it is employed as the positive element of a thermocouple, as will be described more fully hereinafter.

With the barriers 14 positioned in spaced relation in the cavity of the mold 10, zinc and antimony metals in the predetermined portions of 42% to 45% by weight of zinc and 58% to 55% by weight of antimony are admitted to the cavity and bonded to the thin strips or barriers 14. In forming the metallic body bonded to the barriers 14, the composite element can be made by melting the metals zinc and antimony in the predetermined proportions and casting the melt directly into the cavity 12 around the barriers 14. Where the casting method is employed, it has been found to be desirable to add up to about 1% of aluminum or other suitable metal to the zinc-antimony melt to function as a deoxidizer and to prevent sticking of the resulting zinc-antimony metallic body to the mold when cooled. Where aluminum is added to the melt, it is desired that the zinc and antimony constituents be maintained in their proportion of from 42% to 45% of zinc and 58% to 55% of antimony.

In casting the metallic body about the barriers 14, it is sometimes found to be desirable to preheat the mold 10, thereby preventing sticking of the cast metallic body to the mold. It is also sometimes desirable to provide the surface of the barriers with a thin wash, such as of tin, to prevent oxidation of the metallic surfaces of the barrier and to facilitate the bonding of the metallic body with the barriers. As the metallic body formed of the zinc and antimony metals solidifies in the cavity 12 of the mold, it is found that the zinc-antimony alloy effectively bonds with the surface of the strips or barriers 14 giving a good electrical contact therewith, producing an integral unitary element.

The element cast in the mold of Fig. 1, as described hereinbefore, is illustrated in Fig. 2. As shown, the barriers 14 divide the metallic body 18 formed of the zinc and antimony into sections of predetermined size. The edges of the barriers 14 which were positioned in the slots 16 of the mold, extend outwardly from the cast body and where desired can be machined off leaving an element, the sides of which are symmetrical. An examination of this element reveals that a very good bond results by casting the zinc-antimony alloy about the barriers 14, the resulting element being sufficiently strong to withstand shock and machining.

Instead of casting the zinc-antimony alloy into the metallic body about the barriers 14, the composite element 20 shown in Fig. 2 can be produced by placing well mixed granules of zinc and antimony in the predetermined proportions described hereinbefore about the barriers 14 and then subjecting the mixed granules to sufficient heat, as in an electric furnace, to effect a fusion of the granules. In fusing the granules, the resulting product is simultaneously fused and bonded to the strips 14, thus producing a strong and homogeneous thermoelectric element. The composite element produced by the fusion method can also be machined, and similarly to the cast element, the metallic body formed from the zinc and antimony constituents carries a portion of the zinc in dispersion in the body.

In an embodiment of this invention, a thin barrier strip 22, as shown in Fig. 4 and having at least one side thereof recessed as at 24, can be employed in place of the rectangular barrier strips 14 illustrated in Figs. 1 and 2. By employing the thin strip or ribbon 22 having a recess 24, a portion of the molten or fused zinc-antimony in the predetermined proportions solidifies about the edge of the strip 22 in the recess 24. Thus the portion of the metallic body in the recess 24 functions to strengthen the composite element as an integral structure. If an excess of the zinc-antimony metallic body is present on any surface of the element, and particularly that portion above the recess 24 of the barrier strip, it can readily be machined from the element, giving a symmetrical appearance and a smooth surface.

For purposes of illustration, the thermocouple element 20 is shown in Fig. 5 as comprising the positive element 20 as employed against a negative element 26 of constantan. It is to be noted as employed in this form, that the positive element 20 has the barrier strips 14 extending transversely to the direction of the flow of current in the thermocouple as shown by the arrows in Fig. 5, and that they effectively divide the positive element 20 into a plurality of sections segregated one from the other but which by reason of their good contacts with the barriers 14 form a continuous path for the flow of current therethrough.

Since it is sometimes found to be difficult to remove the composite element 20 from the mold 10 described hereinbefore, the element 20 can be formed in a mold which will facilitate the positioning of the barrier strips and the stripping of the composite element from the mold. Referring to Figs. 6 through 10, there is illustrated a mold 28 formed of a plurality of parts 30, 32 and 34, the part 30 comprising a substantially U-shaped member, as shown in Fig. 7, formed of asbestos or other similar material and having a channel or groove 36 positioned about one of its internal edges. This groove or recess 36 is of a size sufficient for receiving the edges of the barriers 14 and when assembled with its adjacent part 30 retains the barrier 14 in a predetermined position in the mold. The part 34 comprises a blank end suitable for closing the U-shaped opening in the mold, while the part 32 is a non-grooved U-shaped portion similar to the part 30 but disposed to be placed adjacent the part 34. In assembling the mold with the barriers 14 therein, the parts 34 and 32 of the mold are positioned adjacent each other after which a barrier 14 is placed in the groove 36 of the part 30 and it is positioned adjacent the part 32. The positioning of the parts 30 carrying the barriers 14, is continued until a mold of the desired size is constructed, after which another part 34 is so placed with respect to the assembly as to close the other end of the mold. The zinc-antimony metallic body can then be formed and bonded to the barriers 14 either by casting the metals or by fusing the granules of zinc and antimony, as described hereinbefore.

Referring to Figs. 9 and 10 of the drawings, it is evident that where a continuous bond of the zinc and antimony metallic body is desired, that smaller barriers 14 may be employed in the assembled mold, leaving a space in the mold above the barriers to be filled with the molten or fused zinc and antimony constituents of the metallic body. As described hereinbefore, any excess of the metallic body can be machined from the element and where desired, the overhanging of the barrier strips 14 can also be machined from the element.

In practice where the element 20 formed as hereinbefore described is employed as a positive element of a thermocouple, it is found that it has a very high efficiency for the conversion of thermal energy to electrical energy, the barrier strips apparently not affecting the specific resistance of the element to such an extent as to detrimentally decrease its efficiency. Instead, it is found that the element has a longer life than those elements formed of zinc and antimony and which do not contain the barrier strips, on evidence of feathering at the cold junction being found after having been in service for more than 7 months. It is thought that the barriers limit the extent of the migration of that portion of the zinc present in the form of a dispersion to the individual sections between the barriers, thus preventing a concentration of the zinc in the form of a dispersion at the cold junction of the thermocouple with a resulting feathering.

Although this invention has been described with reference to a particular embodiment thereof, it is, of course, not to be limited thereto except insofar as is necessitated by the prior art and the scope of the appended claims.

I claim as my invention:

1. A thermocouple element comprising a metallic body containing zinc and antimony, a portion of the zinc being present in the metallic body in the form of a substantially uniform dispersion, and a plurality of thin strips of metal impervious to zinc disposed in the metallic body transverse to the normal flow of current therein when it is employed as an element of a thermocouple, the thin strips limiting the extent of migration of the zinc present in the body in the form of a dispersion.

2. A thermocouple element comprising a metallic body formed from 42% to 45% of zinc and from 58% to 55% of antimony, a portion of the zinc being present in the metallic body in the form of a substantially uniform dispersion, and a plurality of thin strips of dissimilar metal impervious to the zinc in the form of a dispersion disposed in the metallic body, the thin strips being of a size substantially equal to the cross section of the metallic body and being so positioned therein as to be transverse to the normal flow of the current in the body when it is employed as the positive element of a thermocouple.

3. A thermocouple element comprising a metallic body containing from 42% to 45% of zinc and from 58% to 55% of antimony, a portion of the zinc being present in the metallic body in the form of a substantially uniform dispersion, and a plurality of thin strips of dissimilar metal impervious to zinc and of a size substantially equal to the cross section of the metallic body disposed in spaced relation therein across the body, the metallic strips being bonded to the composition of the metallic body to give good electrical contact therewith and provide a unitary body having the strips transverse to the normal flow of current when the body is employed as an element of a thermocouple.

4. In a thermocouple for the conversion of thermal energy to electrical energy, in combination, a negative element and a positive element in good electrical contact therewith for securing the efficient flow of current through the couple, the positive element comprising a metallic body containing from 42% to 45% of zinc and from 58% to 55% of antimony, a portion of the zinc being present in the body in the form of a dispersion, and a plurality of thin strips of dissimilar metal which is impervious to zinc disposed in spaced relation in the metallic body and bonded therewith, the thin strips having a size substantially equal to the cross section of the metallic body and being positioned therein transverse to the flow of current in the element to prevent the migration of the zinc in the form of a dispersion to one end of the element thereby rendering the element substantially permanently stable.

5. A thermocouple element comprising a metallic body containing from 42% to 45% of zinc and from 58% to 55% of antimony, a portion of the zinc being present in the metallic body in the form of a dispersion, and a plurality of thin strips of metal selected from the iron group disposed in spaced relation in the metallic body to divide it into sections of predetermined size, the metallic strips being bonded to the composition of the adjacent sections of the metallic body to give a good contact therewith and provide an integral unitary body, the strips being so positioned in the metallic body as to be transverse to the normal flow of current in the body when it is employed as an element of a thermocouple.

6. A thermocouple element comprising a metallic body containing from 42% to 45% of zinc and from 58% to 55% antimony, a portion of the zinc being present in the metallic body in the form of a dispersion, and a plurality of thin strips of metal selected from the iron group disposed in spaced relation in and to extend substantially across the metallic body, the metallic strips being transverse to the normal flow of current in the body and being bonded to the composition of the metallic body to give good electrical contact therewith and provide a unitary body in which migration of the portion of zinc in the form of a dispersion is limited by the transverse strips.

7. A thermocouple element comprising a metallic body formed from 42% to 45% of zinc and from 58% to 55% of antimony, a portion of the zinc being present in the form of a substantially uniform dispersion, and a plurality of thin strips of conducting material disposed in the metallic body transverse to the normal flow of current therein when it is employed as an element of a thermocouple, the thin strips being impervious to zinc and limiting the extent of migration of the zinc present in the body in the form of a dispersion.

MARIA TELKES.